(12) United States Patent
Yen

(10) Patent No.: US 10,829,600 B2
(45) Date of Patent: Nov. 10, 2020

(54) MICROPOROUS SHEET PRODUCT AND METHODS FOR MAKING AND USING THE SAME

(71) Applicant: William Winchin Yen, Acton, MA (US)

(72) Inventor: William Winchin Yen, Acton, MA (US)

(*) Notice: Subject to any disclaimer, the term of this patent is extended or adjusted under 35 U.S.C. 154(b) by 0 days.

(21) Appl. No.: 15/323,678

(22) PCT Filed: Nov. 4, 2015

(86) PCT No.: PCT/US2015/058998
§ 371 (c)(1),
(2) Date: Jan. 3, 2017

(87) PCT Pub. No.: WO2016/073580
PCT Pub. Date: May 12, 2016

(65) Prior Publication Data
US 2017/0152359 A1 Jun. 1, 2017

Related U.S. Application Data

(60) Provisional application No. 62/075,515, filed on Nov. 5, 2014.

(51) Int. Cl.
C08J 5/18 (2006.01)
B29C 48/78 (2019.01)
(Continued)

(52) U.S. Cl.
CPC .............. *C08J 5/18* (2013.01); *B29C 48/78* (2019.02); *B32B 5/24* (2013.01); *B32B 27/12* (2013.01);
(Continued)

(58) Field of Classification Search
CPC ........ C08J 5/18; C08J 9/0095; C08J 2323/06; C08J 2423/22; B29L 2031/3468;
(Continued)

(56) References Cited

U.S. PATENT DOCUMENTS 2,806,256 A 9/1957 Smith-Johannsen
3,351,495 A 11/1967 Larsen et al.
(Continued)

FOREIGN PATENT DOCUMENTS

CN 1972986 A 5/2007
CN 101267934 A 9/2008
(Continued)

OTHER PUBLICATIONS

Ulbricht, "Advanced functional polymer membranes," Polymer, 47:2217-62 (2006).
(Continued)

*Primary Examiner* — Hai Vo
(74) *Attorney, Agent, or Firm* — Kriegsman & Kriegsman

(57) ABSTRACT

Microporous sheet product and methods of making and using the same. In one embodiment, the microporous sheet product is made by a process that includes melt-extruding a sheet material using an extrusion mixture that includes a thermoplastic polymer, a non-cross-linked elastomer having a molecular weight of at least 50,000 Da, and a compatibilizing agent. By way of example, the thermoplastic polymer may be a polyolefin, the non-cross-linked elastomer may be a polyisobutylene, and the compatibilizing agent may be mineral spirits. After extrusion, the sheet material may be cooled, and the sheet material may be stretched. The microporous sheet product may be used, for example, as a battery separator, as a food packaging material, as a diffusion barrier in the ultrafiltration of colloidal matter, and in disposable garments.

20 Claims, 3 Drawing Sheets

(51) Int. Cl.
| | |
|---|---|
| *H01M 2/14* | (2006.01) |
| *H01M 2/16* | (2006.01) |
| *B32B 5/24* | (2006.01) |
| *B32B 27/32* | (2006.01) |
| *B32B 27/12* | (2006.01) |
| *B32B 27/34* | (2006.01) |
| *B65B 25/00* | (2006.01) |
| *B29L 31/34* | (2006.01) |

(52) U.S. Cl.
CPC .............. *B32B 27/32* (2013.01); *B32B 27/34* (2013.01); *B65B 25/001* (2013.01); *H01M 2/145* (2013.01); *H01M 2/1653* (2013.01); *B29L 2031/3468* (2013.01); *C08J 2323/06* (2013.01); *C08J 2323/22* (2013.01); *C08J 2345/00* (2013.01); *C08J 2377/06* (2013.01); *C08J 2423/06* (2013.01); *C08J 2423/22* (2013.01)

(58) Field of Classification Search
CPC ........... B32B 5/24; B32B 27/12; B32B 27/32; B32B 27/34
See application file for complete search history.

(56) References Cited

U.S. PATENT DOCUMENTS

| | | |
|---|---|---|
| 3,407,253 A | 10/1968 | Yoshimura et al. |
| 3,426,754 A | 2/1969 | Bierenbaum et al. |
| 3,512,997 A | 5/1970 | Cohly et al. |
| 3,558,764 A | 1/1971 | Isaacson et al. |
| 3,679,538 A | 7/1972 | Druin et al. |
| 3,679,540 A | 7/1972 | Zimmerman et al. |
| 3,801,404 A | 4/1974 | Druin et al. |
| 3,843,761 A | 10/1974 | Bierenbaum et al. |
| 3,920,588 A | 11/1975 | Traeubel et al. |
| 3,967,978 A | 7/1976 | Honda et al. |
| 4,024,323 A | 5/1977 | Versteegh |
| 4,100,324 A | 7/1978 | Anderson et al. |
| 4,138,459 A | 2/1979 | Brazinsky et al. |
| 4,210,709 A | 7/1980 | Doi et al. |
| 4,224,394 A | 9/1980 | Schmidt |
| 4,247,498 A | 1/1981 | Castro |
| 4,279,979 A | 7/1981 | Benson et al. |
| 4,283,442 A | 8/1981 | Machi et al. |
| 4,285,751 A | 8/1981 | Feinberg et al. |
| 4,287,276 A | 9/1981 | Lundquist, Jr. et al. |
| 4,288,503 A | 9/1981 | Goldberg |
| 4,330,602 A | 5/1982 | O'Rell et al. |
| 4,346,142 A | 8/1982 | Lazear |
| 4,427,737 A | 1/1984 | Cilento et al. |
| 4,522,902 A | 6/1985 | Minchak et al. |
| 4,539,256 A | 9/1985 | Shipman |
| 4,614,575 A | 9/1986 | Juda et al. |
| 4,650,730 A | 3/1987 | Lundquist et al. |
| 4,699,857 A | 10/1987 | Giovannoni et al. |
| 4,774,155 A | 9/1988 | Nientiedt et al. |
| 4,833,172 A | 5/1989 | Schwarz et al. |
| 4,873,037 A | 10/1989 | Chau et al. |
| 4,948,544 A | 8/1990 | Van Unen et al. |
| 4,957,943 A | 9/1990 | McAllister et al. |
| 4,994,335 A | 2/1991 | Kamaei et al. |
| 5,051,183 A | 9/1991 | Takita et al. |
| 5,217,649 A | 6/1993 | Kulkarni et al. |
| 5,240,655 A | 8/1993 | Troffkin et al. |
| 5,281,491 A | 1/1994 | Rein et al. |
| 5,328,760 A | 7/1994 | Gillberg-LaForce |
| 5,336,573 A | 8/1994 | Zuckerbrod et al. |
| 5,478,677 A | 12/1995 | Choi et al. |
| 5,503,791 A | 4/1996 | Fortuin et al. |
| 5,641,562 A | 6/1997 | Larson et al. |
| 5,641,565 A | 6/1997 | Sogo |
| 5,830,554 A | 11/1998 | Kaimai et al. |
| 5,865,926 A | 2/1999 | Wu et al. |
| 5,922,417 A | 7/1999 | Singleton et al. |
| 5,939,181 A | 8/1999 | Kumano et al. |
| 5,942,587 A | 8/1999 | Arjunan et al. |
| 5,948,557 A | 9/1999 | Ondeck et al. |
| 5,955,187 A | 9/1999 | McCormack et al. |
| 5,926,161 A | 10/1999 | Zucker |
| 6,001,165 A | 12/1999 | Shibuya et al. |
| 6,010,776 A | 1/2000 | Exsted et al. |
| 6,011,194 A | 1/2000 | Buglino et al. |
| 6,013,151 A | 1/2000 | Wu et al. |
| 6,025,092 A | 2/2000 | Doyle et al. |
| 6,159,634 A | 12/2000 | Yen et al. |
| 6,242,127 B1 | 6/2001 | Paik et al. |
| 6,396,682 B1 | 5/2002 | Kim et al. |
| 6,461,724 B1 | 10/2002 | Radovanovic et al. |
| 6,495,292 B1 | 12/2002 | Yen |
| 6,558,591 B2 | 5/2003 | Calis |
| 6,558,840 B1 | 5/2003 | Hikmet |
| 6,559,195 B1 | 5/2003 | Yamamoto et al. |
| 6,696,524 B2 | 2/2004 | Hausmann |
| 6,726,732 B2 | 4/2004 | Kim et al. |
| 6,730,440 B1 | 5/2004 | Bauer et al. |
| 7,288,316 B2 | 10/2007 | Jester |
| 7,452,624 B2 | 11/2008 | Hatoh et al. |
| 7,479,243 B2 | 1/2009 | Funaoka et al. |
| 7,754,387 B2 | 7/2010 | Harada et al. |
| 7,815,825 B2 | 10/2010 | Funaoka et al. |
| 7,867,649 B2 | 1/2011 | Yamaguchi et al. |
| 7,892,672 B2 | 2/2011 | Nishikawa |
| 8,048,520 B2 | 11/2011 | Hayes et al. |
| 8,079,480 B2 | 12/2011 | Haering et al. |
| 8,092,877 B2 | 1/2012 | Jester et al. |
| 8,129,450 B2 | 3/2012 | Wood et al. |
| 8,133,840 B2 | 3/2012 | Mika et al. |
| 8,216,740 B2 | 7/2012 | Prevoir et al. |
| 8,262,973 B2 | 9/2012 | Lee et al. |
| 8,388,878 B2 | 3/2013 | Parrinello et al. |
| 8,551,641 B2 | 10/2013 | Ahn et al. |
| 8,579,621 B2 | 11/2013 | Sano et al. |
| 8,690,981 B2 | 4/2014 | Mao |
| 8,703,283 B2 | 4/2014 | Goerlitz et al. |
| 8,722,231 B2 | 5/2014 | Brilmyer et al. |
| 8,728,617 B2 | 5/2014 | Benenati et al. |
| 8,728,659 B2 | 5/2014 | Armacanqui et al. |
| 8,748,028 B2 | 6/2014 | Takita et al. |
| 8,778,525 B2 | 7/2014 | Kikuchi et al. |
| 8,859,129 B2 | 10/2014 | Brilmyer et al. |
| 8,993,646 B2 | 3/2015 | Huang |
| 9,159,978 B2 | 10/2015 | Yen |
| 2001/0009716 A1 | 7/2001 | Taguchi et al. |
| 2001/0024716 A1 | 9/2001 | Chen et al. |
| 2003/0124324 A1 | 7/2003 | Langley et al. |
| 2004/0080068 A1 | 4/2004 | Ooizumi et al. |
| 2004/0265565 A1 | 12/2004 | Fischer et al. |
| 2005/0101206 A1 | 5/2005 | McCormack et al. |
| 2006/0051530 A1 | 3/2006 | Schwarz et al. |
| 2006/0051648 A1 | 3/2006 | Fujibayashi et al. |
| 2007/0178324 A1 | 8/2007 | Masuda et al. |
| 2007/0221567 A1 | 9/2007 | Simmons et al. |
| 2008/0113259 A1* | 5/2008 | Brilmyer ............ H01M 2/1613 429/50 |
| 2008/0269366 A1 | 10/2008 | Shaffer et al. |
| 2009/0081543 A1 | 3/2009 | Takita et al. |
| 2009/0098450 A1 | 4/2009 | Kikuchi et al. |
| 2009/0142657 A1 | 6/2009 | Yen |
| 2009/0155430 A1 | 6/2009 | Lee et al. |
| 2009/0181295 A1 | 7/2009 | Usami et al. |
| 2009/0233145 A1 | 9/2009 | Takami et al. |
| 2009/0270552 A1 | 10/2009 | Sugawara |
| 2009/0280310 A1 | 11/2009 | Nitta et al. |
| 2010/0015515 A1 | 1/2010 | Takata et al. |
| 2010/0028758 A1 | 2/2010 | Eaves et al. |
| 2010/0178544 A1* | 7/2010 | Nishikawa ......... B01D 67/0011 429/129 |
| 2010/0221522 A1 | 9/2010 | Mrozinski |
| 2011/0081601 A1 | 4/2011 | Weber et al. |
| 2011/0143185 A1 | 6/2011 | Nishikawa |
| 2011/0311878 A1 | 12/2011 | Inagaki et al. |

(56) References Cited

U.S. PATENT DOCUMENTS

| | | | |
|---|---|---|---|
| 2012/0015229 A1* | 1/2012 | Ohashi | B32B 27/08 429/144 |
| 2012/0288695 A1 | 11/2012 | Jenkins | |
| 2013/0029126 A1 | 1/2013 | Yen | |
| 2013/0034769 A1 | 2/2013 | Takagi et al. | |
| 2013/0052735 A1 | 2/2013 | DeRosa et al. | |
| 2013/0280584 A1 | 10/2013 | Matsumura | |
| 2013/0287937 A1 | 10/2013 | Joo et al. | |
| 2014/0094076 A1* | 4/2014 | Mrozinski | C08J 5/18 442/56 |
| 2014/0147726 A1 | 5/2014 | Toyoda | |
| 2014/0335421 A1* | 11/2014 | Li | B01D 71/26 429/246 |
| 2015/0005405 A1 | 1/2015 | Ishihara et al. | |
| 2015/0118540 A1 | 4/2015 | Fujiwara et al. | |
| 2015/0207121 A1 | 7/2015 | Frenzel et al. | |
| 2015/0228948 A1 | 8/2015 | Maruyama et al. | |
| 2017/0166716 A1 | 6/2017 | Yen | |
| 2017/0214021 A1 | 7/2017 | Yen | |

FOREIGN PATENT DOCUMENTS

| | | |
|---|---|---|
| CN | 101291788 A | 10/2008 |
| CN | 101356216 A | 1/2009 |
| CN | 101386686 A | 3/2009 |
| CN | 101541534 A | 9/2009 |
| CN | 103213364 A | 7/2013 |
| CN | 105655518 A | 6/2016 |
| EP | 1911352 A1 | 4/2008 |
| EP | 2036699 A1 | 3/2009 |
| EP | 2091347 B1 | 9/2010 |
| EP | 1757653 B1 | 1/2011 |
| EP | 2018407 B1 | 10/2012 |
| EP | 2796187 A1 | 10/2014 |
| EP | 2881163 A1 | 6/2015 |
| GB | 790098 A | 2/1958 |
| GB | 838468 A | 6/1960 |
| JP | 2000260413 A | 9/2000 |
| JP | 4371670 B2 | 11/2009 |
| JP | 4746797 B2 | 8/2011 |
| JP | 4746830 B2 | 8/2011 |
| KR | 20080056229 A | 6/2008 |
| WO | 9420995 A2 | 9/1994 |
| WO | 9902585 A1 | 1/1999 |
| WO | 2007117042 A1 | 10/2007 |
| WO | 2008136970 A1 | 11/2008 |
| WO | 2009044227 A1 | 4/2009 |
| WO | 2009051278 A2 | 4/2009 |
| WO | 2009123812 A1 | 10/2009 |
| WO | 2013065738 A2 | 5/2013 |
| WO | 2016028989 A1 | 2/2016 |
| WO | 2016073558 A1 | 5/2016 |
| WO | 2016073580 A1 | 5/2016 |

OTHER PUBLICATIONS

Rohatgi et al., "Separator Membrane from Crosslinked Poly(Vinyl Alcohol) and Poly(Methyl Vinyl Ether-alt-Maleic Anhydride)," Nanomaterials, 5:398-414 (Mar. 2015).

Mendelsohn et al., "Fabrication of Microporous Thin Films from Polyelectrolyte Multilayers," Langmuir, 16:5017-23 (2000).

Wu et al., "Novel Microporous Films and Their Composites," Journal of Engineered Fibers and Fabrics, 2(1):49-59 (2007).

Baldwin, "A Review of State-of-the-Art Separator Materials for Advanced Lithium-Based Batteries for Future Aerospace Missions," NASA/TM-2009-215590, http://ntrs.nasa.gov/archive/nasa/casi.ntrs.nasa.gov/20090017842.pdf (2009).

"Battery Innovation: High Power/High Energy," Celgard, http://www.celgard.com/battery-innovation (accessed Sep. 2015).

"Li-ion Battery Materials: Separators," Targray Technology International Inc., http://www.targray.com/li-ion-battery/separators/pe-pp-separators (accessed Sep. 2015).

Arora et al., "Battery Separators," Chemical Reviews, 104(10):4419-62 (2004).

Abstract for Jeon et al., "Phase Behavior of Polymer/diluent/diluent mixtures and their application to control microporous membrane structure," Journal of Membrane Science, 300(1-2):172-81 (2007).

First page of Oh et al., "Microporous polyolefin film for battery separator," SPE/Antec 2001 Conference Proceedings, Dallas, Texas, vol. 1, p. 354-358.

Brandrup, Polymer Handbook, 1999, John Wiley & Sons, pp. 688-713 (Year: 1999).

Polymer Properties Database: Solubility Parameter; http://polymerdatabase.com/polymer%20physics/delta%20Table.html (2015).

Poly(vinylidene fluoride); https://polymerdatabase.com/polymers/polyvinylidenefluoride.html (2015).

* cited by examiner

MICROPOROUS SHEET PRODUCT AND METHODS FOR MAKING AND USING THE SAME

CROSS-REFERENCE TO RELATED APPLICATIONS

The present application claims the benefit under 35 U.S.C. 119(e) of U.S. Provisional Patent Application No. 62/075,515, filed Nov. 5, 2014, the disclosure of which is incorporated herein by reference.

BACKGROUND OF THE INVENTION

The present invention relates generally to microporous sheet products and relates more particularly to a novel microporous sheet product and to methods of making and using the same.

Microporous sheet products are well-known and commonly used articles found in items as diverse as, for example, electrochemical batteries, food packaging materials, and ultrafiltration devices. For example, in electrochemical batteries, microporous sheet products are commonly used as battery separators. Typically, an electrochemical battery includes at least one pair of electrodes of opposite polarity and, in many cases, includes a series of electrode pairs of alternating polarity. The current flow between the electrodes of each pair is maintained by an electrolyte. Depending on the nature of the battery system, the electrolyte may be acidic, alkaline, or substantially neutral, and the battery may a primary or secondary (rechargeable or storage) system. For example, in alkaline storage batteries, which include, but are not limited to, primary, secondary, nickel, zinc and silver cells, the electrolyte is generally an aqueous solution of potassium hydroxide. By contrast, in lead acid batteries, the electrolyte is typically a sulfuric acid solution, and, in lithium storage batteries, the electrolyte is typically an organic solution of lithium salt, such as lithium trifluoromethyl sulfonate, lithium tetrafluoro borate, lithium hexafluorophosphate, or another lithium salt.

A battery separator is typically provided in a battery between adjacent electrodes of opposite polarity to prevent direct contact between the oppositely charged electrode plates since such direct contact would result in a short circuit of the battery. In general, it is highly desirable for the separator to possess one or more of the following qualities: (i) to be thin and lightweight to aid in providing a battery of high energy density and specific energy; (ii) to have a structure that inhibits dendrite formation between the electrode plates; (iii) to have the ability to enhance the uptake of the electrolytic composition over the electrode plates and, in so doing, to promote a substantially uniform distribution of the electrolytic composition over the electrode plates (an effect generally referred to as wicking); (iv) to provide the property of freely permitting electrolytic conduction; and (v) to have a dimensionally stable structure even during thermal excursions (internal or external heating). It is further highly desirable for the separator to be made in an economical and environmentally safe manner while being substantially free of defects, such as pinholes and the like.

One known type of separator comprises a nonwoven fibrous material, the nonwoven fibrous material typically having a high porosity, an average pore size of at least 10 microns, and low resistivity. An example of such a separator is disclosed in U.S. Pat. No. 4,279,979, inventors Benson et al., which issued Jul. 21, 1981, and which is incorporated herein by reference. In particular, in the aforementioned patent, there is disclosed a nonwoven fibrous substrate for a battery separator. The aforementioned substrate, which is said to be for an alkaline battery separator, is made of a lightweight, porous, heat bonded, synthetic organic sheet material having a basis weight of less than about 35 gsm and a thickness of less than about 200 microns. The major fibrous component is synthetic pulp comprising thermoplastic polyolefin fibers having a prefused microfibrillar structure similar to wood pulp. The minor fibrous component is a high tenacity polyamide fiber having a fiber length greater than about 6 mm. The heat bonding by partial fusion of the microfibrillar polyolefin is sufficient to impart to the sheet material a wet tensile strength of at least 400 g/in width while permitting retention of air permeability of about 100 liters per minute and more. The substrate is said to be particularly well-suited for use in nickel-zinc batteries.

Another known type of separator is disclosed in U.S. Pat. No. 4,283,442, inventors Machi et al., which issued Aug. 11, 1981, and which is incorporated herein by reference. In particular, in the aforementioned patent, there is disclosed a method of producing a dimensionally stable battery separator. The method is characterized by grafting acrylic acid and/or methacrylic acid onto a polyethylene film, treating the resulting membrane with an aqueous alkaline solution, and drying the treated membrane under application of tension.

Still another known type of separator comprises a microporous sheet product that is formed by extruding a composition that includes a polyolefin and a liquid plasticizer and, thereafter, removing the plasticizer to produce a sheet with a microporous structure. An example of such a separator is disclosed in U.S. Pat. No. 4,287,276, inventors Lundquist, Jr. et al., which issued Sep. 1, 1981, and which is incorporated herein by reference. In particular, in the aforementioned patent, there is disclosed a battery separator membrane useful in alkaline battery systems. The membrane is said to be made from a homogeneous admixture of a polyolefin, a plasticizer, and a filler. The polyolefin, which is preferably a polyethylene or polypropylene of high density, must have an average molecular weight of at least 100,000. The plasticizer, which improves the processability of the composition (i.e., by lowering the melt viscosity or reducing the amount of power input which is required to compound and to fabricate the composition and aids in inducing porosity), may be a low molecular weight polymer, such as polyisobutylene, polybutadiene, polystyrene, atactic polypropylene, ethylene-propylene rubber, ethylene-vinyl acetate copolymer, oxidized polyethylene, coumarone-indene resins and terpene resins. The filler may be a particulate material made of titania, alumina, magnesium or calcium hydroxide or mixtures thereof which have a surface area of from 100 to 385 $m^2/cc$ and a pore volume of at least 0.075 cc/gm.

Another example of a separator of the type described above is disclosed in U.S. Patent Application Publication No. US 2013/0029126 A1, inventor Yen, which was published Jan. 31, 2013, and which is incorporated herein by reference. In particular, in the aforementioned publication, there is disclosed a sheet product suitable for use as a battery separator, as well as a method of forming the sheet product. The method comprises forming a mixture of a polyolefin and a fluid having a high vapor pressure, shaping the mixture into a sheet material and subjecting the sheet material to stretching/fluid vaporization at high temperature to form an intermediate material having a ratio of percent fluid to percent polymer crystallinity of between 0.15 and 1, followed by a second stretching/fluid vaporization at a lower temperature while removing a portion of the remainder of the fluid from the sheet. The resultant sheet is annealed and the remainder of fluid is removed to form a sheet product having a thickness comprising a stratified structure of small and larger pore layered configuration across its thickness.

Additional documents that may be of interest include the following, all of which are incorporated herein by reference: U.S. Pat. No. 8,993,646 B2, inventor Huang, issued Mar. 31, 2015; U.S. Pat. No. 8,778,525 B2, inventors Kikuchi et al., issued Jul. 15, 2014; U.S. Pat. No. 8,579,621 B2, inventors Sano et al., issued Nov. 12, 2013; U.S. Pat. No. 8,551,641 B2, inventors Ahn et al., issued Oct. 8, 2013; U.S. Pat. No. 8,388,878 B2, inventors Parrinello et al., issued Mar. 5, 2013; U.S. Pat. No. 8,216,740 B2, inventors Prevoir et al., issued Jul. 10, 2012; U.S. Pat. No. 8,079,480 B2, inventors Haering et al., issued Dec. 20, 2011; U.S. Pat. No. 7,452,624 B2, inventor Hatoh et al., issued Nov. 18, 2008; U.S. Pat. No. 6,730,440 B1, inventors Bauer et al., issued May 4, 2004; U.S. Pat. No. 6,558,591 B2, inventor Calis, issued May 6, 2003; U.S. Pat. No. 6,242,127 B1, inventors Paik et al., issued Jun. 5, 2001; U.S. Pat. No. 5,948,557, inventors Ondeck et al., issued Sep. 7, 1999; U.S. Pat. No. 5,641,565, inventor Sogo, issued Jun. 24, 1997; U.S. Pat. No. 5,328,760, inventor Gillberg-LaForce, issued Jul. 12, 1994; U.S. Pat. No. 5,051,183, inventors Takita et al., issued Sep. 24, 1991; U.S. Pat. No. 4,957,943, inventors McAllister et al., issued Sep. 18, 1990; U.S. Pat. No. 4,873,037, inventors Chau et al., issued Oct. 10, 1989; U.S. Pat. No. 4,833,172, inventors Schwarz et al., issued May 23, 1989; U.S. Pat. No. 4,774,155, inventors Nientiedt et al., issued Sep. 27, 1988; U.S. Pat. No. 4,699,857, inventors Giovannoni et al., issued Oct. 13, 1987; U.S. Pat. No. 4,539,256, inventor Shipman, issued Sep. 3, 1985; U.S. Pat. No. 4,427,737, inventors Cilento et al., issued Jan. 24, 1984; U.S. Pat. No. 4,210,709, inventors Doi et al., issued Jul. 1, 1980; U.S. Pat. No. 3,512,997, inventors Cohly et al., issued May 19, 1970; U.S. Pat. No. 3,351,495, inventors Larsen et al., issued Nov. 7, 1967; U.S. Patent Application Publication No. US 2015/0207121 A1, inventors Frenzel et al., published Jul. 23, 2015; European Patent No. 2 091 347 B1, published Sep. 8, 2010; European Patent No. 2 018 407 B1, published Oct. 10, 2012; Arora et al., "Battery Separators," Chemical Reviews, 104(10):4419-4462 (2004); Jeon et al., "Phase Behavior of Polymer/diluent/diluent Mixtures and Their Application to Control Microporous Membrane Structure," Journal of Membrane Science, 300(1-2):172-81 (2007); and Oh et al., "Microporous polyolefin film for battery separator," SPE/Antec 2001 Conference Proceedings, Dallas Tex., vol. 1, p. 354-358.

SUMMARY OF THE INVENTION

It is an object of the present invention to provide a novel microporous sheet product.

According to one aspect of the invention, there is provided a microporous sheet product, the microporous sheet product made by a method comprising (a) melt-extruding an extrusion mixture to form a sheet material, the extrusion mixture comprising (i) a thermoplastic polymer, (ii) a non-cross-linked elastomer, the non-cross-linked elastomer having a molecular weight of at least 50,000 Da, and (iii) a compatibilizing agent, the compatibilizing agent promoting mixing of the thermoplastic polymer and the non-cross-linked elastomer; and (b) then, cooling the sheet material, whereby micropores are formed in the sheet material.

In a more detailed feature of the invention, the thermoplastic polymer may comprise one or more thermoplastic polymers selected from the group consisting of polyolefins, polyamides, polyethylene terephthalate, polyacrylics, and polyvinyl acetate.

In a more detailed feature of the invention, the thermoplastic polymer may comprise one or more thermoplastic polymers selected from the group consisting of polyolefins and polyamides.

In a more detailed feature of the invention, the thermoplastic polymer may be at least one polyolefin.

In a more detailed feature of the invention, the thermoplastic polymer may be at least one member selected from the group consisting of a polyethylene and a polypropylene.

In a more detailed feature of the invention, the thermoplastic polymer may be at least one polyamide.

In a more detailed feature of the invention, the thermoplastic polymer may constitute about 15-90% by volume of the extrusion mixture.

In a more detailed feature of the invention, the non-cross-linked elastomer may have a molecular weight of at least 100,000 Da.

In a more detailed feature of the invention, the non-cross-linked elastomer may have a molecular weight of between 200,000 Da and 10,000,000 Da.

In a more detailed feature of the invention, the non-cross-linked elastomer may comprise one or more members selected from the group consisting of polyisobutylene, polyisoprene, thermoplastic elastomers of polyolefin, polyurethane, and polyester, and copolymers and terpolymers thereof.

In a more detailed feature of the invention, the non-cross-linked elastomer may comprise a polyisobutylene.

In a more detailed feature of the invention, the non-cross-linked elastomer may constitute about 1-50% by volume of the extrusion mixture.

In a more detailed feature of the invention, the compatibilizing agent may be selected from the group consisting of plasticizers and surfactants.

In a more detailed feature of the invention, the compatibilizing agent may comprise a plasticizer selected from the group consisting of polyethylene oxide, polyethylene glycol, propylene glycol, phthalates, mineral oil, and mineral spirits.

In a more detailed feature of the invention, the compatibilizing agent may comprise mineral spirits.

In a more detailed feature of the invention, the compatibilizing agent may constitute about 1-80% by volume of the extrusion mixture.

In a more detailed feature of the invention, the compatibilizing agent may constitute about 5-70% by volume of the extrusion mixture.

In a more detailed feature of the invention, the compatibilizing agent may constitute about 10-60% by volume of the extrusion mixture.

In a more detailed feature of the invention, the thermoplastic polymer may constitute about 15-90% by volume of the extrusion mixture, the non-cross-linked elastomer may constitute about 1-50% by volume of the extrusion mixture, and the compatibilizing agent may constitute about 1-80% by volume of the extrusion mixture.

In a more detailed feature of the invention, the extrusion mixture may further comprise a superabsorbent polymer.

In a more detailed feature of the invention, the superabsorbent polymer may constitute up to about 40% by volume of the extrusion mixture.

In a more detailed feature of the invention, the extrusion mixture may further comprise an inorganic filler.

In a more detailed feature of the invention, the inorganic filler may constitute up to about 20% by volume of the extrusion mixture.

In a more detailed feature of the invention, the method for making the microporous sheet product may further comprise removing the compatibilizing agent from the sheet material.

In a more detailed feature of the invention, the step of removing the compatibilizing agent may comprise vaporizing the compatibilizing agent.

In a more detailed feature of the invention, the method for making the microporous sheet product may further comprise stretching the sheet material.

In a more detailed feature of the invention, the microporous sheet product may have a resistivity below 300 ohm-cm as tested in a 30% KOH solution.

In a more detailed feature of the invention, the microporous sheet product may have a resistivity below about 100 ohm-cm as tested in a 30% KOH solution.

In a more detailed feature of the invention, the microporous sheet product may have a resistivity below 10,000 ohm-cm as tested in an organic lithium electrolyte.

In a more detailed feature of the invention, the microporous sheet product may have an average pore size below 5 microns.

According to another aspect of the invention, there is provided a microporous sheet product made by a method comprising (a) dissolving a cyclic olefin copolymer and a non-cross-linked elastomer in a solvent to form a homogeneous solution, the non-cross-linked elastomer having a molecular weight of at least 50,000 Da; and (b) forming a sheet material with the homogeneous solution using a solvent cast technique.

In a more detailed feature of the invention, the solvent may be mineral spirits.

In a more detailed feature of the invention, the non-cross-linked elastomer may be polyisobutylene.

According to yet another aspect of the invention, there is provided a multilayer sheet product, the multilayer sheet product comprising a plurality of stacked layers, wherein at least one of the stacked layers is any of the microporous sheet products described above.

According to still another aspect of the invention, there is provided a multilayer sheet product, the multilayer sheet product comprising a first layer and a second layer, the first layer and the second layer being in direct contact with one another, the first layer comprising any of the microporous sheet products described above, the second layer being devoid of a non-cross-linked elastomer.

The present invention is also directed at a method of making a microporous sheet product, the method comprising the steps of (a) melt-extruding an extrusion mixture to produce a sheet material, the extrusion mixture comprising a thermoplastic polymer, a non-cross-linked elastomer, the non-cross-linked elastomer having a molecular weight of at least 50,000 Da, and a compatibilizing agent, the compatibilizing agent promoting mixing of the thermoplastic polymer and the non-cross-linked elastomer, (b) then, cooling the sheet material, whereby micropores are formed in the sheet material, and (c) then, subjecting the sheet material to a stretching/vaporizing step, whereby the compatibilizing agent is removed from the sheet material.

In a more detailed feature of the invention, the thermoplastic polymer may be at least one member selected from the group consisting of a polyolefin and a polyamide, wherein the non-cross-linked elastomer may comprise a polyisobutylene, and wherein the compatibilizing agent may comprise mineral spirits.

The present invention is additionally directed at a method of separating the electrodes of a battery, the method comprising positioning, between the electrodes, any of the microporous sheet products described above.

The present invention is further directed at a method of packaging a food item, the method comprising contacting the food item with any of the microporous sheet products described above.

Additional objects, as well as aspects, features and advantages, of the present invention will be set forth in part in the description which follows, and in part will be obvious from the description or may be learned by practice of the invention. In the description, reference is made to the accompanying drawings which form a part thereof and in which is shown by way of illustration various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF THE INVENTION

Figure 1:
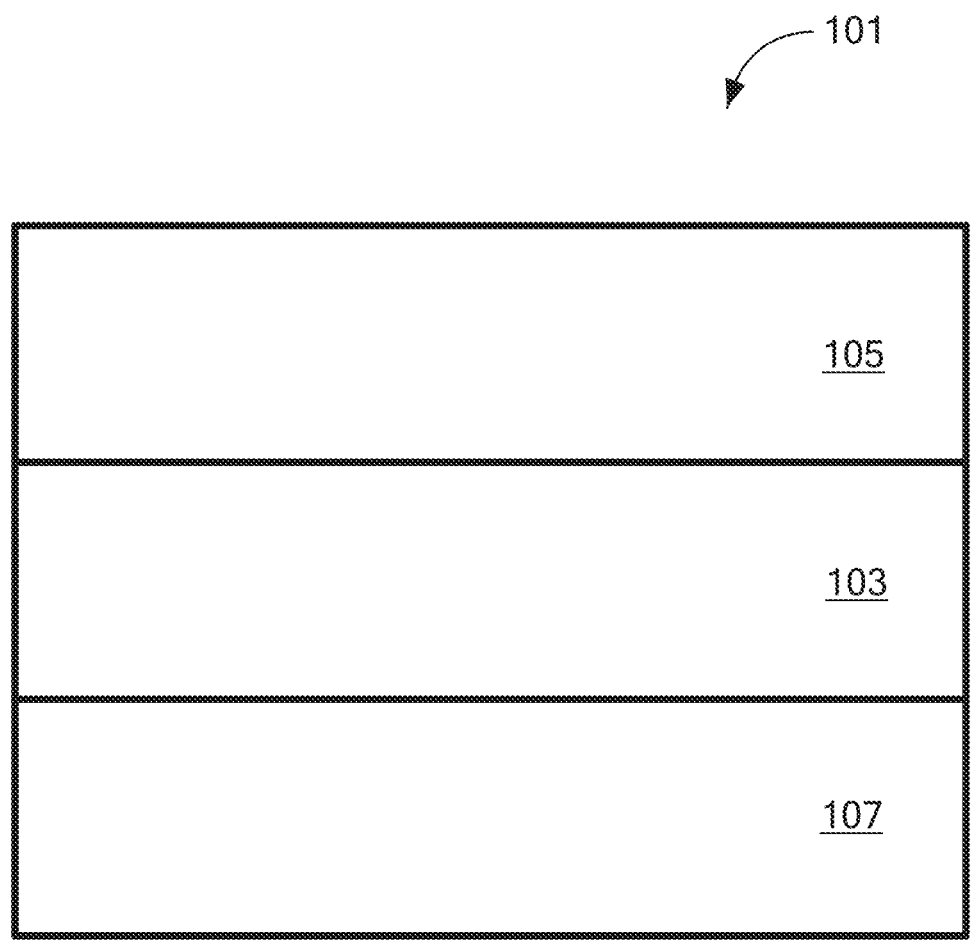
FIG. 1 is a schematic side view of a multi-layer microporous sheet product constructed according to the present invention.

The present invention is directed at a novel microporous sheet product, as well as to methods of making and using the same. According to a first embodiment of the invention, a microporous sheet product having desirable properties can be prepared by (a) melt-extruding an extrusion mixture to form a sheet material, the extrusion mixture comprising (i) a thermoplastic polymer, (ii) a non-cross-linked elastomer, the non-cross-linked elastomer having a molecular weight of at least 50,000 Da, and (iii) a compatibilizing agent that promotes mixing between the thermoplastic polymer and the non-cross-linked elastomer; and (b) then, cooling the sheet material, whereby micropores in the sheet material are created by phase-separation, the compatibilizing agent substantially filling the micropores of the sheet material to produce a "wet" porous structure. In certain instances, for example, where the microporous sheet material is used as a food packaging material, the thus-produced microporous sheet material may be used without any further processing. In other instances, for example, where the microporous sheet material is used as a battery separator, the microporous sheet material may thereafter be processed to extract the compatibilizing agent from the sheet material, thereby producing a "dry" porous structure. In any event, whether the porous structure is "wet" or "dry," the thermoplastic polymer and the non-cross-linked elastomer form a matrix of crystalline and amorphous regions (i.e., domains) within the sheet material, with the thermoplastic polymer predominantly forming the crystalline domains of the matrix and with the non-cross-linked elastomer predominantly forming the amorphous domains of the matrix.

As can be seen from the above, according to the first embodiment of the invention, a thermoplastic polymer and the aforementioned non-cross-linked elastomer are combined with a compatibilizing agent to form a single phase polymer mixture, which mixture may then be extruded as a film in flat or tubular form. The thermoplastic polymer helps to provide an easily extruded composition, and the non-cross-linked elastomer provides ease in creating porosity, softening molecular chains, and creating a more elastic tear-forgiving structure. Upon cooling of the melt mixture, the thermoplastic polymer phase-separates from the non-cross-linked elastomer and the compatibilizing agent. The thermoplastic polymer may form crystalline regions, which may seed the thermoplastic dense region, and the non-cross-linked elastomer may form amorphous regions around the thermoplastic polymer, which amorphous regions may enhance the flexibility of the porous network upon stretching. The thermoplastic polymer and the non-cross-linked elastomer are typically molecularly intermixed. When stretched, the thermoplastic domains do not demonstrate the same elasticity as the non-cross-linked elastomer domains; thus, the different elasticity between the two types of domains creates separation, resulting in a network of interconnected pores, with the non-cross-linked elastomer forming fibrils connecting the thermoplastic dense regions. Such a porous structure allows dissolved compounds to permeate across the membrane, enabling additive transport and ionic conduction through the membrane.

Without wishing to be limited to any particular theory as to how the invention works, it is believed that the non-cross-linked elastomer tends to limit and to interfere with the re-crystallization of the thermoplastic polymer upon cooling. As a result, the crystallinity of the overall film is far below that of a comparable film made with only the thermoplastic polymer. Such a reduction in crystallinity improves electrolyte conductivity, reduces process film breakage, and improves flexibility of the final product. The non-cross-linked elastomer may form connective strands within the membrane structure that enhance durability of the final membrane. Consequently, the final structure may be more elastic and forgiving than a formulation that does not contain such an elastomer. Thus, upon stretching of the film, microtears may form between the regions of amorphous and crystalline structure, leading to the formation of pores. These pores, in turn, lead to an increase in diffusion rate.

According to a second embodiment of the invention, a microporous sheet product having desirable properties can be prepared by dissolving a cyclic olefin copolymer and a non-cross-linked elastomer in a suitable solvent to form a homogeneous solution and then casting the homogeneous solution to form a singular film or a coating on a suitable substrate, such as a porous film or a battery electrode.

For purposes of clarity, some of the terms used herein and in the appended claims to describe the subject invention are explained further below:

The term "sheet material" is intended to refer to a unitary article having two large surfaces with respect to its length and breadth dimensions and having a thickness between said surfaces. In general, the term is used to describe structures achieved during the initial extrusion or shaping of material into a sheet-like form and of structures produced during subsequent processing of the sheet material.

The term "sheet product" is intended to encompass a single-layer or multi-layer structure consisting of a single sheet material or comprising a plurality of stacked or laminated sheet materials.

The term "thermoplastic" is intended to refer to a polymer that becomes pliable or moldable above a specific temperature and returns to a solid state upon cooling. The molecular chains of a thermoplastic polymer typically disassociate on heating and associate through intermolecular forces on cooling and restore the bulk properties. Thermoplastics typically have distinctive melting and glass transition temperatures. The physical properties of a thermoplastic change drastically on phase change.

The term "elastomer" is intended to refer to a polymer with viscoelasticity, that is, an ability to resume its original shape when a deforming force is removed. An elastomer typically lacks a distinctive melt temperature and has a very low glass transition temperature; thus, elastomers typically lack drastic phase changes. For purposes of the present application, the term "elastomer" is intended to encompass melt-extrudable elastomers but not thermoset vulcanized elastomers.

The terms "plasticizer," "fluid," or "solvent," used interchangeably, refer to liquid components used in the extrusion mixture used to form sheet material. These terms may also be used in reference to a liquid used in a cooling bath for initial cooling of a formed sheet material, fluid used in other processing steps, and for the fluid removed during a stretching/fluid vaporization step. This liquid material is at least partially soluble to elastomer and miscible with one or more of the thermoplastic polymers of the membrane, typically within a few units of the solubility parameter of the thermoplastic polymer(s).

The term "separator" is intended to refer to a component of a battery, in particular a storage battery, by which the component maintains a separation between adjacent electrode plates or elements of opposite polarity. The separator may be of various configurations, such as flat (preferred), ribbed, corrugated sheet which may be in the form of a membrane or envelope capable of maintaining separation of adjacent electrodes.

The term "dendrite" is intended to refer to growths that develop on and extend outward from the surface of an electrode element and are due to the re-plating of electrode material during cycling of the battery. Dendrite formations that traverse through a separator from one electrode to another electrode of opposite polarity may cause shorting of the battery cell.

The term "fluidity" is intended to refer to polymeric compositions that exhibit flow properties that are caused by the physical ability of the polymer molecules of the composition to slide over one another. This ability is enhanced by the inclusion of a fluid material, especially when the polymer has minor (low difference of) solubility properties with respect to the fluid component in contact therewith.

The terms "superabsorbent polymer," "SAP," and "superabsorber" refer to a polymeric compound which can absorb and retain large amounts of liquid relative to its own mass. The superabsorbent polymer creates interstices from the absorbing liquid.

The term "crystallinity" refers to a regular or structured orientation of polymer molecules with respect to each other within a polymer mass and is distinguished from a random, irregular orientation of polymer molecules within a polymer mass to give an amorphous material. The crystallinity of a polymer mass can be determined, for example, by conventional x-ray diffraction analysis.

The term "solubility parameter" refers to a numerical estimate of the degree of interaction between materials and is a good indication of material compatibility, particularly for nonpolar materials, such as many polymers. The solubility parameter for polyolefin is typically about 8, for paraffin oil is about 8, for nitrile rubber is about 9, for polyester is about 11, for polyamide is about 14, for water is 23.4, and for ethylene glycol is about 30.

$$\delta = \sqrt{\frac{\Delta H_v - RT}{V_m}}$$

δ=solubility parameter, [cal 1/2 cm-3/2]
$H_v$=heat of vaporization
R=gas constant
T=temperature
$V_m$=molar volume of molecules in the condensed phase As noted above, according to one embodiment, the microporous sheet product of the present invention may be formed, at least in part, by melt-extruding an extrusion mixture, the extrusion mixture comprising (a) a thermoplastic polymer, (b) a non-cross-linked elastomer, and (c) a compatibilizing agent, the compatibilizing agent promoting mixing between the thermoplastic polymer and the non-cross-linked elastomer and also creating micropores in the resultant sheet material.

The thermoplastic polymer of the above-described extrusion mixture may comprise one or more thermoplastic polymers of the type that can be used to form a microporous sheet by melt-extrusion. The one or more thermoplastic polymers may include one or more thermoplastic homopolymers, copolymers or terpolymers. The thermoplastic polymer of the present invention preferably has a crystallinity of at least 30% and preferably has a weight average molecular weight of from about 20,000 Da to about 10,000,000 Da, more preferably about 100,000 Da to about 10,000,000 Da. Examples of suitable classes of thermoplastic polymers may include, but are not limited to, polyolefins, polyamides, polyethylene terephthalate, polyacrylics, polyvinyl acetate, and the like. Preferred classes of thermoplastic polymers are polyolefins and polyamides. Examples of polyolefins include, but are not limited to, linear low density or high density polyethylene, polypropylene, and polybutylene.

Melt flow index or MFI is a measure of the ease of flow of the melt of a thermoplastic polymer. It is defined as the mass of polymer, in grams, flowing in ten minutes through a capillary of a specific diameter and length by a pressure applied via prescribed alternative gravimetric weights for alternative prescribed temperatures. The method for determining MFI is described in ASTM D1238 and ISO 1133. Melt flow rate is an indirect measure of the molecular weight of a polymer. Preferred polyolefins for use as the thermoplastic polymer of the present invention have a Melt Flow Index (MFI) below about 8.

Preferred polyamides for use as the thermoplastic polymer of the present invention typically have formic acid Relative Viscosity (RV) of 4 and above in accordance with ISO 307.

As noted above, the thermoplastic polymer component of the present invention may comprise multiple polymers. For example, a polyethylene may be blended with a second polymer, such as a polypropylene, a polyamide, a fluoropolymer, or the like, in varying percentages. Alternatively, a blend of different molecular weight grades of the same polymer (e.g., a polyethylene) may be used.

The thermoplastic polymer preferably constitutes about 15-90% by volume of the extrusion mixture, more preferably about 20-80%, by volume of the extrusion mixture.

The non-cross-linked elastomer of the above-described extrusion mixture may comprise one or more non-cross-linked elastomers. Preferred non-cross-linked elastomers according to the present invention are hydrocarbon-based, examples of which include polyisobutylene, polyisoprene, thermoplastic elastomers of polyolefin, polyurethane and polyester, as well as copolymers and terpolymers thereof. Particularly preferred non-cross-linked elastomers according to the present invention are polyisobutylene, polyisoprene, and polyolefin elastomers. The non-cross-linked elastomer of the present invention has a molecular weight of at least 50,000 Da, more preferably at least 100,000 Da, and most preferably between 200,000 Da and 10,000,000 Da. The non-cross-linked elastomer preferably has a crystallinity below 20%. As noted above, the addition of the non-cross-linked elastomer to a thermoplastic polymer tends to create a more amorphous, swellable and diffusion-ready film, creating stretchable inter-phase porosity. It also facilitates the incorporation of other swelling agents, such as superabsorbent polymers.

The non-cross-linked elastomer preferably constitutes about 1-50% by volume of the extrusion mixture. Amounts in excess of about 50% may result in a product that self-adheres upon winding and/or stacking, which self-adherence may be undesirable for battery separator use (although some tack is desirable for adhesion against the contacting electrodes at elevated operating temperature).

The compatibilizing agent of the aforementioned extrusion mixture may be used to promote a uniform mixing of the thermoplastic polymer with the non-cross-linked elastomer and to help the mixture to flow at elevated temperatures (e.g., about 100-250° C.). In addition, the compatibilizing agent may also be used to create (i.e., by phase-separation) micropores in the extruded sheet material.

The compatibilizing agent of the present invention may be, for example, any plasticizer or surfactant that promotes the uniform mixing of the various polymers at elevated temperatures. In most cases, the compatibilizing agent is a liquid. Examples of plasticizers that may be used as a compatibilizing agent according to the present invention include, but are not limited to, low molecular weight organic liquids, such as mineral spirits, mineral oil, lower molecular weight alkanes, $C_9$-$C_{20}$ aliphatic, alicyclic or aromatic hydrocarbons, polyethylene oxide, glycols (e.g., polyethylene glycol, propylene glycol), phthalates, oils, food additives, food grade oils, and the like, as well as mixtures thereof. Mineral spirits is a preferred compatibilizing agent for battery separator applications. Food grade oils and surfactants are preferred compatibilizing agents for many food packaging applications.

As noted above, the compatibilizing agent phase-separates from the various polymers and, in so doing, creates micropores in the thus-formed sheet material. In those instances where, for example, the microporous sheet material is to be used as a food packaging material, no further processing of the microporous sheet material may be needed. On the other hand, in those instances where, for example, the microporous sheet material is to be used, for example, as a battery separator, the microporous sheet material may thereafter be treated so that the compatibilizing agent is at least partially removed from the microporous sheet material. Such removal of the compatibilizing agent may be effected, for example, by a conventional solvent extraction technique and/or by the stretching/vaporization technique of U.S. Patent Application Publication No. US 2013/0029126 A1. The removal of the compatibilizing agent in the aforementioned fashion creates open (available) capillaries for electrolyte conductivity in the finished sheet product.

The compatibilizing agent preferably constitutes about 1-80% by volume, more preferably 5-70% by volume, and most preferably 10-60% by volume, of the mixture.

The above-described extrusion mixture may further comprise a superabsorbent polymer. Such a superabsorbent polymer may be used, for example, to absorb liquid that may be added to the microporous sheet product. For example, in those instances in which the microporous sheet product is used as a battery separator, the superabsorbent polymer may be used to absorb liquid electrolyte. In so doing, the superabsorbent polymer may reduce the pore size of the battery separator, as well as improving the wettability of the battery separator, allowing electrolytic conduction, and reducing the resistance of the battery separator. The use of a superabsorbent polymer may, in some cases, obviate the need to stretch the extruded sheet material.

The superabsorbent polymer of the present invention may comprise one or more types of superabsorbent polymers. Examples of suitable superabsorbent polymers include, but are not limited to, various cross-linked polymers, such as cross-linked polyacrylates (e.g., sodium, hydrogen, potassium, lithium, or zinc), methacrylates, polyacrylamides, hydroxypropyl and carboxymethyl celluloses, polyvinyl alcohol copolymers, polyethylene oxides, starch-grafted polyacrylates or polyacrylamides, ethylene maleic anhydride copolymers, and copolymers thereof. The superabsorbent polymer may further include a functional cation, such as a lithium ion, a sodium ion, a potassium ion, an alkaline earth metal ion, or a zinc ion. The superabsorbent polymer is preferably in particle form and preferably has a particle size smaller than about 100 microns, more preferably smaller than about 30 microns, and most preferably between 1 to 10 microns. In this manner, by keeping the particle size of the superabsorbent polymer small, it is easier to evenly distribute the superabsorbent polymer throughout the extruded sheet material, thereby reducing the frequency of pinholes being formed in the resultant sheet product. Organic acid superabsorbers, such as, but not limited to, polyacrylic acid, polymethacrylic acid, and ethylene maleic anhydride polymer, tend to best absorb liquid near neutral pH. The extent of cross-linking in the superabsorbent polymer should be kept within specific limits so that the superabsorbent may absorb liquids, such as a liquid electrolyte, without forming an amorphous gel.

The superabsorbent polymer preferably constitutes about 0-40% by volume of the extrusion mixture.

The above-described extrusion mixture may further comprise small amounts of fillers, colorants, anti-oxidants, stabilizers, and the like. For example, the mixture may comprise one or more inorganic fillers, which may improve the porosity and rate of swelling of the sheet product. Where the sheet product is used as a battery separator, such swelling creates beneficial cell stack pressure. Suitable inorganic fillers may include, but are not limited to, carbonates and oxides of silicon (e.g., silicates), aluminum, lithium, magnesium, calcium, titanium, zinc, zirconium and barium. Such an inorganic filler may be in the form of fine particles, preferably about 0.02-10 microns in diameter. Such particles may have a surface area of at least 5 $m^2/g$, and preferably from about 5-200 $m^2/g$ and may have a pore volume (BET) of from about 0.01-1 ml/g. The particles may be prepared by any method that results in fine particles, such as, but not limited to, milling, condensation, precipitation, fume condensation, or any other appropriate method. These compounds, when added to the extrusion mixture, increase porosity, especially after stretching of the polymer sheet material. Preferably, the filler material is essentially insoluble in the intended medium, e.g., basic solution for alkaline application, and has an elevated melting temperature of over 500° C. Other examples of suitable fillers are disclosed in U.S. Pat. No. 8,388,878, which is incorporated herein by reference.

Where a filler is used as part of the extrusion mixture, the filler preferably constitutes about 0-20% by volume of the mixture.

As noted above, an extrusion mixture of the type described above may be melt-extruded to produce a microporous sheet material, and, depending on the use to which the microporous sheet material is intended to be put, the microporous sheet material may then undergo additional processing. Details of a suitable melt-extrusion process and of a suitable method for processing the extruded sheet material to produce a microporous sheet product suitable for use as a battery separator are provided below.

First, the extrusion mixture may be prepared and extruded. Mixing may be performed prior to or during the extrusion process. For example, the various components of the extrusion mixture may be fed into a single- or twin-screw feed chamber of an extruder. An example of a suitable extruder is disclosed in PCT International Publication No. WO 2009/051278 A2, which was published on Apr. 23, 2009, and which is incorporated herein by reference. Preferably, a co-rotating twin screw continuous extruder is used to blend the various components of the extrusion mixture and to produce an extrudate. The extruder, which preferably has two shafts, preferably has at least a L/D (length over diameter) of at least 24 and at least 5 barrels (temperature zones). The mixture may be fed into the first barrel, with the second barrel being used to blend and to melt the mixture. Optionally, liquid plasticizer may be injected into a subsequent barrel, and an open barrel may be used to evacuate any potential volatiles, such as water vapor, in the mixture. Finally, a pumping barrel may be used to pressurize the melt and to pump the melted mixture from the extruder into a die on a continuous basis. The extruder preferably comprises at least 3 L/D of right-handed conveying screw bushing, at least 1/3 L/D of left-handed screw bushing for conveying control, and at least 1 L/D of right-handed kneading blocks for the melting and mixing of materials. The melted material may then be pumped through a heated metal slotted die, which may be used to form the extrudate into a shaped film of sheet material.

The extrusion mixture may be heated to a temperature that is higher than the melt temperature ($T_m$) of the thermoplastic polymer measured by conventional differential scanning calorimetry (DSC) but, at the same time, is below the boiling point temperature of the fluid. Temperatures of from about 100° C. (212° F.) to about 250° C. (482° F.) are normally suitable for this purpose while subjecting the mixture to shear forces to cause the components to form a uniform mixture prior to being shaped (such as by extrusion through a die head) into the initial shaped sheet material. The thermoplastic polymer normally loses the majority, if not all, of its crystallinity during this operation.

The thus-formed sheet material may then be cooled. This may be accomplished, for example, by casting the sheet material onto a chilled roll or by immersing the sheet material in a cooling bath for a sufficient time to solidify the sheet material. The cooling roll or bath is preferably maintained at a temperature below 100° C. so that the sheet material is cooled below the melt temperature of the thermoplastic polymer.

In certain instances, for example, where the sheet material is to be used as a food packaging material, it may be acceptable for the compatibilizing agent to be retained in situ. In other instances, for example, where the sheet material is to be used as a battery separator, the cooled sheet material may be subjected to some form of processing to remove the compatibilizing agent from the sheet material. Such processing may involve a stretching/fluid vaporization technique that may comprise, in a first step, stretching the sheet in at least one direction. This first direction of stretching may be conducted in the machine direction from which the sheet material exits the extrusion die head and the cooling bath. The stretching can be readily accomplished, for example, by passing the sheet material through nip rollers of a set rotation surface speed and then through a second set of higher speed nip rollers prior to a take-up roller. Alternately, other conventional stretching means can be used, such as a tenter method, an inflation method or a combination thereof. The stretching in the first direction may involve stretching the sheet material at least about 100% to 1000% of its initial dimension in a first direction. This first stretching is preferably done while maintaining the sheet material at an elevated temperature. For example, the stretching of polyethylene may be done at temperatures of about 71° C.-121° C. (i.e., 160° F.-250° F.) depending on the composition of the sheet. The stretching in the first direction may be accomplished in a one-step operation or in a series of stretching operations to achieve the desired degree of elongation of the sheet material.

Subsequent to or simultaneous with stretching in a first direction, the sheet material may be stretched in a second direction, which second direction may be transverse to the first stretching direction. The second stretch may be transverse to the machine direction where the first stretch was in the machine direction or vice versa. The stretching in the second direction may comprise stretching from about 100-1000% of its initial dimension in the second dimension. The second stretch is preferably done while maintaining the sheet at an elevated temperature of the type employed for the first stretch. The combined stretches may have an overall ratio of about 1.5-100 fold. Depending on the formulation, machinery set-up, the stretching may be performed in sequential monoaxial steps or simultaneous biaxial stretches. One or more of the film stretch steps can be performed as described in U.S. Patent Application Publication No. US 2013/0029126 A1, which is incorporated herein by reference. The above-described stretching may serve not only to further open porosity in the sheet but also to reduce the thickness of the sheet and to align molecular structures to maximize mechanical strength.

Simultaneous to the stretching, a portion or all of the compatibilizing agent may be removed from the sheet material by vaporization. The ease with which a given compatibilizing agent may be vaporized will depend on the volatility of the compatibilizing agent. Certain compatibilizing agents, such as mineral spirits, are highly volatile and can easily be vaporized by stretching at an elevated temperature. The fluid in the sheet material may also be extracted with a suitable solvent, such as a hydrocarbon like hexane and one or more chlorinated solvents well-known in the industry. For certain applications, some of the compatibilizing agent may remain in the final product as a plasticizer or antioxidant.

With the stretched sheet material under tension in at least one or both stretched directions, it may be subjected to annealing. The completeness of annealing is a function of heat-transfer effectiveness, temperature, residence time and relaxation. The stretched sheet material may be maintained under these conditions for a period of at least 1 second. The sheet material may be optionally relaxed in one or both stretched directions (length and/or width of about 5-20% reduction) as known in the art to further improve dimensional stability.

Alternatively, the shaped sheet material may also be extruded in an annular die, forming the sheet in a continuous tubular form. The stretching orientation may be conducted in a conventional single, double or triple bubble blown film equipment. The tubular film may be longitudinally stretched and simultaneously inflated to orient the film under specific temperature.

According to a second embodiment of the invention, a cyclic olefin copolymer may be dissolved with the above-described non-cross-linked elastomer in a common solvent, such as mineral spirits, thereby rendering a homogeneous solution at standard temperature and pressure conditions. A solvent dissolution membrane cast technique may then be used to form the sheet product. To this end, the solution may be cast as a singular film or coated onto a pre-formed polyolefin separator substrate, with the polymer partially impregnating, anchoring and binding the substrate to achieve a functional and dimensionally stable multilayered separator. Such a structure does not need to be stretched.

The above-described homogeneous solution may comprise about 4.5-5% cyclic olefin copolymer, about 4.5-5% of the non-cross-linked elastomer, and about 90% of the solvent. Fillers, such as silica, may be present in an amount up to about 1%.

The thickness of a "dry" microporous sheet product (i.e., a microporous sheet product where the compatibilizing agent has been removed) according to the present invention, prior to being imbibed with any liquid, may be about 0.1-20 mil (about 0.0025-0.50 mm) although the thickness may vary based on the particular application for which the sheet product is intended. The pores (i.e., interstices) of such a "dry" microporous sheet product may have a size in the range of about 0.001 to 100 microns. For microporous applications, the preferred range for the pores is about 0.001 to 5 microns, more preferably about 0.01 to 1 micron. For filtration applications, the preferred range for the pores is about 5 to 100 microns. The pores may have an aspect ratio (length to width) of at least 2, more preferably 5, along the direction in which the product was stretched—if stretching occurred.

The properties of sheet products useful as battery separators include not only permeability, mechanical strength, and dimensional stability, but also properties related to electrolytic solution wicking, absorption, and battery cyclability. The present invention provides a thin, lightweight sheet product that has high electrolyte retention capability, thereby providing the battery with the ability of maintaining electrolyte over the electrode surfaces and achieving high electrolytic conductivity while, when appropriate, providing high inhibition to formation and growth of dendrites between electrode elements of opposite polarity. At the same time, the sheet product of the present invention has high mechanical strength. The measure of resistivity (i.e. the inverse of conductivity) is preferred to be below 300 ohm-cm, more preferably below about 100 ohm-cm, as tested in a 30% KOH electrolyte. The resistivity is targeted below 10,000 ohm-cm, more preferably below 3,000 ohm-cm, in organic lithium electrolyte.

The microporous sheet product of the present invention may consist of a single layer of any of the types described above or may comprise a plurality of stacked or laminated layers, one or more of which may be of any of the types described above. A laminate structure may be readily formed using conventional multi-sheet extrusion head devices (e.g. co-extrusion) or by laminating together, using heat, adhesives, or other means, two or more previously formed layers. Examples of multilayer structures are described in European Patent Application Publication No. EP 1 911 352 A1, published Apr. 16, 2008, which is incorporated herein by reference. One or more of the layers of a multilayer structure may be a protective layer, which may be non-porous to limit the permeability of moisture, oxygen, pathogens or other detrimental microorganisms and to improve film durability and final product shelf-life. Alternatively, the multilayer structure may comprise a middle layer comprising a non-cross-linked elastomer and microporous outer layers not including the non-cross-linked elastomer. In addition to not containing a non-cross-linked elastomer, the composition of the outer layers may differ substantially from that of the inner layer; alternatively, the absence of a non-cross-linked elastomer may be the only compositional difference. In any event, the materials used in the various layers should be sufficiently compatible and miscible to permit adhesion during extrusion and juxtaposition of the layers. A multi-layered configuration does not preclude the coating and lamination of layers with the subject article.

Referring now to FIG. 1, there is shown a schematic side view of a multilayer microporous sheet product constructed according to the present invention, the multilayer microporous sheet product being represented generally by reference numeral 101.

Multilayer microporous sheet product 101 comprises an inner layer 103 and a pair of outer layers 105 and 107, with inner layer 103 being sandwiched between outer layers 105 and 107. Inner layer 103 may be identical in composition to any of the embodiments of the microporous sheet product described above and preferably runs substantially in the same direction as the major surfaces of outer layers 105 and 107. Outer layers 105 and 107 may be identical to one another and may differ from inner layer 103 only in that outer layers 105 and 107 do not include a non-cross-linked elastomer. One or more of layers 103, 105, and 107 may be microporous and may have a pore size of from about 0.001 to 5 microns.

Layers 103, 105 and 107 may be laminated together, for example, by co-extrusion. The entire laminate may be handled and stretched as a single unit.

As can be appreciated, although multilayer microporous sheet product 101 is of the BAB variety (layer A including the non-cross-linked elastomer and layer B not including the non-cross-linked elastomer), multilayer microporous sheet product 101 may be of the ABA variety, the AB variety, the ABC variety (with layer C differing in composition from both layers A and B), the ABCD variety (with layer D differing in composition from layers A, B and C), or other permutations.

In addition to use as a battery separator, the above-described microporous membrane may be put to other uses. For some such uses, the membrane may be used without any further modification thereto whereas, for other uses, the membrane is preferably modified in some manner. One way in which the membrane may be modified is by being imbibed with a material that endows the membrane with a specific function. The imbibing material may be a liquid or a dispersion of solid. Certain applications may require two or more reactive components as imbibing materials to permit the reaction of the reactive components within the microporous sheet structure. Examples of imbibing materials include medicaments, fragrances, flavorings, colorants, antistatic agents, surfactants, antimicrobials, pesticides and solid particulate material, such as activated carbon and pigments.

The microporous sheet product of the present invention may be laminated or coextruded to any of a variety of other structures, such as nonwoven, porous, and non-porous sheet materials, to provide a composite structure. Nonwoven materials may include, but are not limited to, glass, cellulose, polyolefins, polyamide, polyester and other polymers. Lamination may be accomplished by conventional techniques, such as coating, impregnation, adhesive bonding, spot-welding, or by other techniques which do not destroy or otherwise interfere with porosity or which do not create undesirable porosity or perforations.

The microporous sheet product of the present invention may be employed in any of a wide variety of situations where microporous structures may be utilized. For example, the microporous sheet product may be used in the ultrafiltration of colloidal matter, for example, as a diffusion barrier. Alternatively, the membrane may be used as a separator in an electrochemical cell, as a geo-membrane, as a non-woven protective scrim, as a disposable garment or diaper, or as a disposable glove.

Another application of the microporous membrane may be in the field of food packaging, such as in uncooked meat packaging, cooked meat and sausage casing, and cheese packaging, to provide flavor transfer and to promote adhesion. Other applications may be fresh meat packaging, such as chicken shrink bags and ground beef and pork display tray liners, to absorb excess processing fluids. Often packaged foods tend to expel moisture or blood from their solid structure over time. Since the membranes described herein may contain superabsorbers or other mechanisms for retaining moisture, the occurrence of pooled liquids within the food packaging may be minimized. Other applications may include packaging for fresh produce and bread, where equilibria of moisture, oxygen, and carbon dioxide levels should be attained to keep these foods fresh for a longer shelve life.

The following examples are given for illustrative purposes only and are not meant to be a limitation on the invention described herein or on the claims appended hereto. All parts and percentages given in the description, examples and claims appended hereto are by volume unless otherwise stipulated. Further, all ranges of numbers provided herein above shall be deemed to specifically disclose all subset ranges of numbers within each given range.

Where the subject membrane is used as an electrochemical cell separator, the guiding principle for determination of optimal composition is highest conductivity in alkaline electrolyte while demonstrating desirable physical and mechanical characteristics. All samples below were processed similarly, with the material mixture processed in the above-described manner via a co-rotating twin screw extruder. The extruder was set at a temperature of 100° C. at the feed zone, 200° C. at the melt zone, the extruder was vented prior to the pumping section, the extruder pumping section and die were set at 180° C. The melt extrudate was cast onto a cast roller set at 40° C., with the total extrusion rate of 4 kg/hr, the cast roller having a takeoff speed of 4 ft/min.

Materials:
Materials used in the formation of the sheet product include:
Polyethylene—LLDPE GA601 from Lyondell Basell or HDPE 2908 from Nova Chemicals
Polypropylene—F006EC2 from Braskem
Polyamide—Nylon Grilamid L25 from EMS Chemie AG
Polyisobutylene (PIB)—Oppanol B 200 from BASF
Polyacrylate Superabsorbent (SAP) Aquasorb from Arkent
Silica—Sipemat 50s from Evonic
Mineral oil—Kaydol from Sonneborn
Mineral spirits—from Sunnyside
Polyethylene Ethylene Vinyl Acetate copolymer (EVA) NA362006 from Lyondell Bassell
Polyox—WSE308 Polyethylene oxide from Dow Chemical
Span 80 and Tween 60 surfactants from Croda Equipment:
Balance—OHaus I-10 2.5 kg balance
Blender—Ross planetary blender, Hobart, model 3943
Fluid pump—Neptune, model 515AN3
Screw feeder—K-Ton Corp., model K2MVS60
Extruder—Coperion twin screw, model ZSK30
Cast film take-up—Davis Standard Company
Bi-orientation tenter frame—Marshall and Williams Compositions with polyisobutylene were examined for single layer membranes with a principal backbone of polyolefin. Multilayer sheets were also made with polyisobutylene included in the inner layer or in both the inner and outer layers and with the outer layers formed from microporous polyolefin or combinations thereof. Compositions, given in the first part of each of the tables below, refer to volume percentages.

EXAMPLE 1

Referring to Table 1 below, there are shown, by composition and performance, a number of samples of single-layer membranes comprising polyethylene and polyisobutylene. Samples 1A and 1B in Table 1 refer to membranes that have not been stretched. The membrane of Sample 1A was then stretched in the 1A S1 and 1A S2 samples, and the membrane of Sample 1B was then stretched in the 1B S1 and 1B S2 samples. As can be seen, the membranes exhibited swelling and a significant resistivity reduction after the transverse direction (TD) stretch. Minimal wet-out time and minimal resistivity are considered to be desirable properties for the membranes.

TABLE 1

|  | Sample | | | | | |
| --- | --- | --- | --- | --- | --- | --- |
|  | 1A | 1A S1 | 1A S2 | 1B | 1B S1 | 1B S2 |
| Polyisobutylene | 40% | 40% | 40% | 49% | 49% | 49% |
| Polyethylene HDPE 2908 | 33% | 33% | 33% | 17% | 17% | 17% |
| Cosurfactant (Span 80/Tween 60) | 14% | 14% | 14% | 0% | 0% | 0% |
| Silica | 3% | 3% | 3% | 3% | 3% | 3% |
| Polyox | 10% | 10% | 10% | 16% | 16% | 16% |
| Mineral Oil | 0% | 0% | 0% | 16% | 16% | 16% |
| Total | 100% | 100% | 100% | 100% | 100% | 100% |
| Stretch treatment | None | 210% TD | 125% TD | None | 300% TD | 200% TD |
| Original wt. (ave.), g | 0.118 | 0.064 | 0.051 | 0.237 | 0.131 | 0.11 |
| Original thickness, μm | 154 | 131 | 116 | 299 | 245 | 230 |
| Average weight gain, 24 h RT, % | 10% | 85% | 52% | 7% | 62% | 19% |
| Average thickness gain, 24 h RT, % | 6% | 1% | 72% | 0% | 4% | 57% |
| Ave. weight gain after 70 C., % | 23% | 77% | 34% | 11% | 42% | 56% |
| Ave. thickness gain after 70 C., % | 1% | 9% | 137% | 9% | 7% | 128% |
| Time to wet-out (IPA), s | >60 | 4 | 5 | >60 | >60 | 5 |
| Resistivity in 30% KOH: ρ, Ω-cm | 1311 | 13 | 11 | 814 | 107 | 36 |

Thickness was measured using a Mitutoyo 1D-C112EXB Thickness Gauge.

Thickness gain percent of the sample was calculated by measuring the thickness before and after soaking in an electrolyte liquid. Similarly, the weight gain percent of the sample was calculated by measuring the weight of a sample before and after soaking (for a specific time) in an electrolyte liquid.

The resistivity of a membrane was measured by placing the membrane between a pair of electrodes immersed in 30% KOH electrolyte. The electrodes were connected to an HP 4338B Milliohm Meter. When the resistance was measured by the HP meter, with and without the membrane, this difference was the resistance, recorded in ohm-cm-sq. By dividing the resistance by the thickness of the separator, this normalized the reading, or recorded in ohm-cm as the resistivity of the separator.

EXAMPLE 2

Referring to Table 2 below, there are shown, by composition and performance, a number of samples having a coextruded trilayer structure (ABA), with the outer layers A and the inner layers B being defined in the table. The coextruded layers were adhered to one another at the extrusion die opening and were stretched and treated as a single membrane subsequently. This configuration of structural layers yields the advantage of different properties on the surface or in the interior of the membrane. The inner layer of the structure absorbs electrolyte readily, especially when comprising superabsorber polyacrylate or polyethylene oxide, allowing facile diffusion through the microporous outer layers. The microporous outer layer is a protective layer, keeping components of the inner layer in and foreign agents out. Samples 2A, 2B, 2C and 2D in Table 1 refer to membranes that have not been stretched. These membranes were then stretched to yield the 2A S, 2B S, 2C S, and 2D S samples. As can be seen, the stretched and un-stretched membranes performed comparably in terms of having low resistivity.

stretched in the 3A S sample, and the membrane of Sample 3B was then stretched in the 3B S sample. As can be seen, the membranes exhibited a significant reduction in resistivity after the transverse direction (TD) stretch, as observed in a lithium organic electrolyte.

Figure 2:
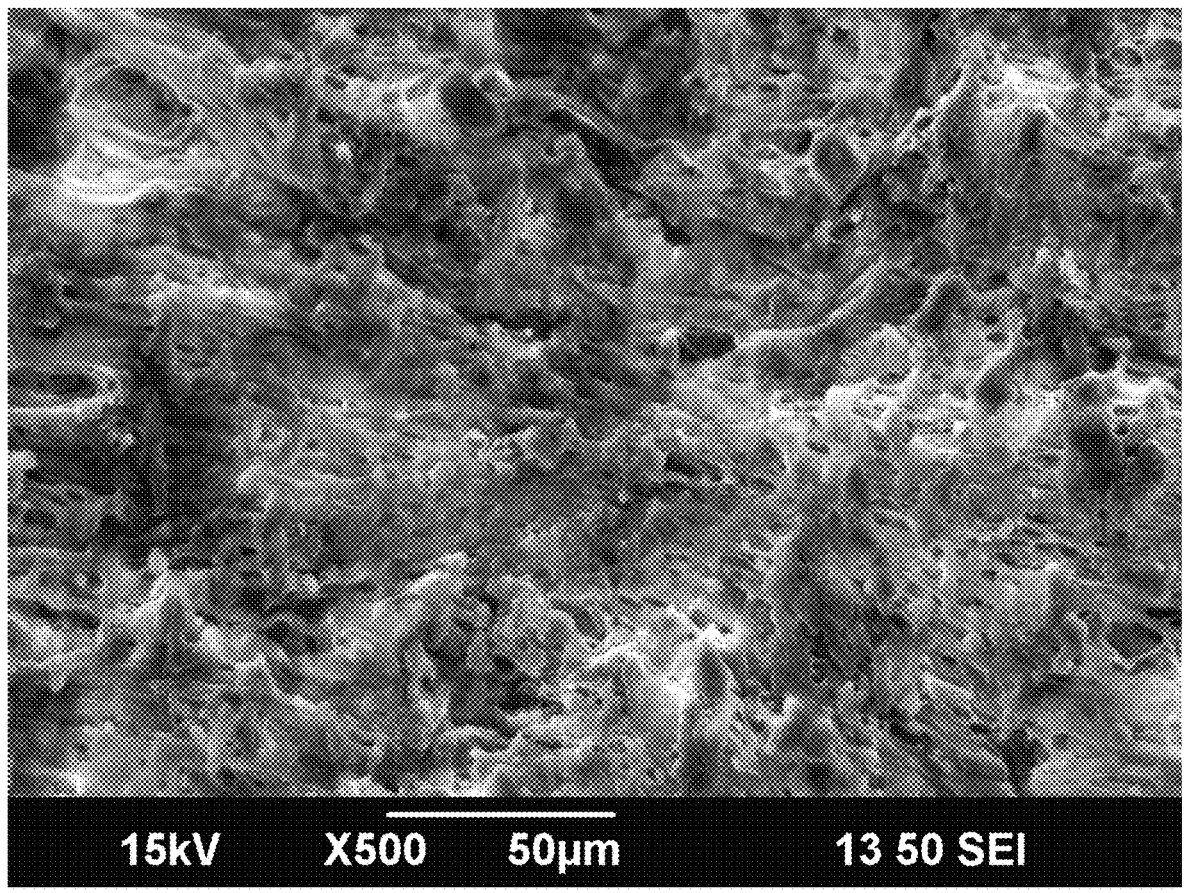
FIG. 2 is a scanning electron microscope (SEM) image of a first surface of the microporous sheet product discussed in Example 3 as Sample 3A S.
Figure 3:
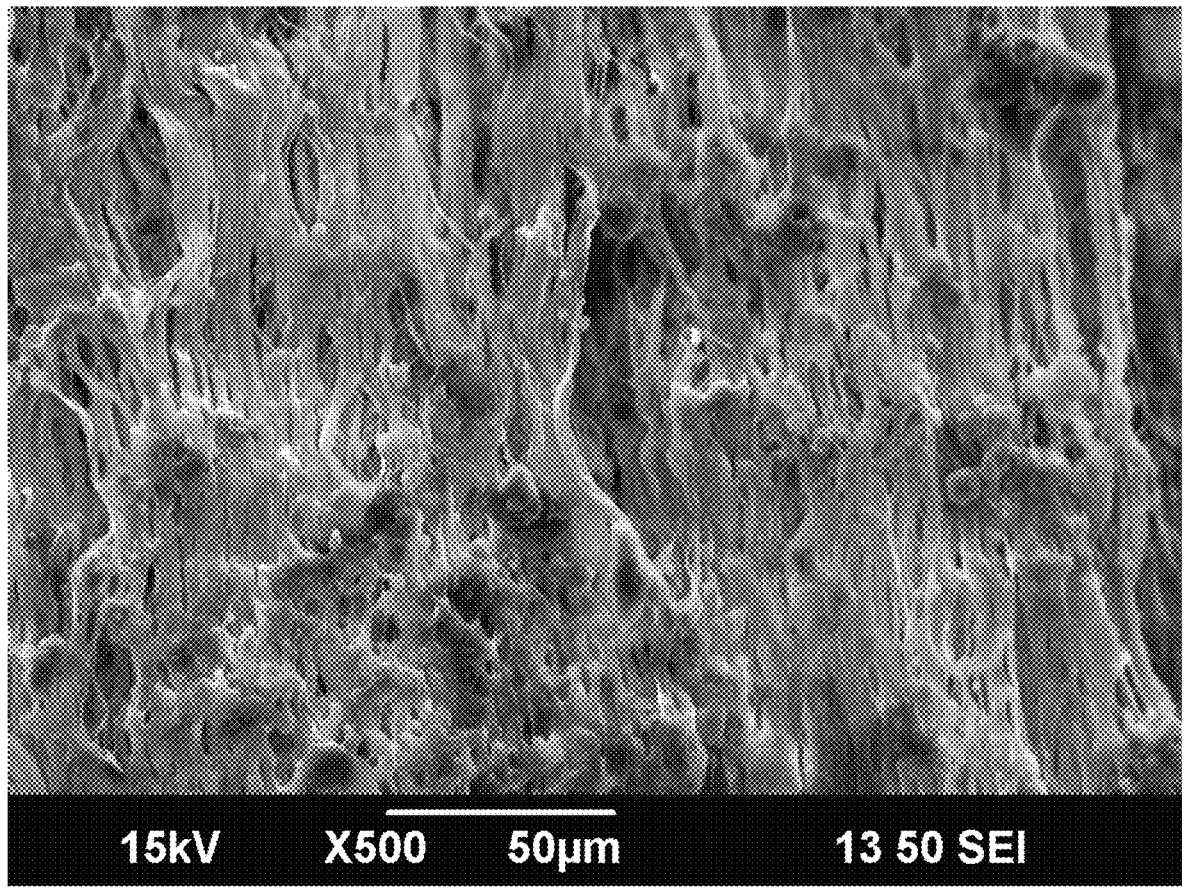
FIG. 3 is a scanning electron microscope (SEM) image of a second surface of the microporous sheet product discussed in Example 3 as Sample 3A S.

Scanning electron microscope (SEM) images, taken of opposing surfaces of Sample 3A S, are shown in FIGS. 2 and 3. As can be seen, the membrane exhibits a uniform blending

TABLE 2

| | Sample ID | | | | | | | |
|---|---|---|---|---|---|---|---|---|
| | 2A | | 2B | | 2C | | 2D | |
| Layers in ABA structure | A | B | A | B | A | B | A | B |
| Nylon 6 or Ny612 | 63% | | 65% | | | | | |
| PIB | | 36% | | 32% | | 36% | | 32% |
| HDPE 2908 | | 38% | | | | 38% | | |
| EVA NA362005 | | | | 41% | 64% | | 73% | 41% |
| Surfactant | 5% | 9% | 4% | 14% | 4% | 9% | 5% | 14% |
| Silica | 1% | 2% | 1% | 3% | 1% | 2% | 1% | 3% |
| Polyox | 32% | 3% | 20% | 3% | 31% | 3% | 22% | 3% |
| Superabs. (Arkent, Aquasorb) | | 12% | | 8% | | 12% | | 8% |
| Mineral spirits | | | 10% | | | | | |
| Total | 100% | 100% | 100% | 100% | 100% | 100% | 100% | 100% |
| Stretch treatment | None | | None | | None | | None | |
| Original Wt (ave.), g | 0.45 | | 0.52 | | 0.54 | | 0.71 | |
| Original thickness (ave.), μm | 565 | | 543 | | 850 | | 803 | |
| Average wt gain, 24 h RT, % | 45% | | 40% | | 31% | | 35% | |
| Average thickness gain, 24 h RT, % | 43% | | 3% | | 47% | | 8% | |
| Average wt gain after 70 c., % | 56% | | 7% | | 46% | | 4% | |
| Average thickness gain after 70 C., % | 32% | | 4% | | 26% | | 7% | |
| Time to wetout (IPA), s | >60 | | >60 | | >60 | | >60 | |
| Resistivity in 30% KOH: ρ, Ωcm | 80 | | 204 | | 64 | | 145 | |
| R in 30% KOH after 70 C., 1 h: ρ, Ωcm | 59 | | 207 | | 36 | | 132 | |

| | Sample ID | | | | | | | |
|---|---|---|---|---|---|---|---|---|
| | 2A S | | 2B S | | 2C S | | 2D S | |
| Layers in ABA structure | A | B | A | B | A | B | A | B |
| Nylon 6 or Ny612 | 63% | | 65% | | | | | |
| PIB | | 36% | | 32% | | 36% | | 32% |
| HDPE 2908 | | 38% | | | | 38% | | |
| EVA NA362005 | | | | 41% | 64% | | 73% | 41% |
| Surfactant | 5% | 9% | 4% | 14% | 4% | 9% | 5% | 14% |
| Silica | 1% | 2% | 1% | 3% | 1% | 2% | 1% | 3% |
| Polyox | 32% | 3% | 20% | 3% | 31% | 3% | 22% | 3% |
| Superabs. (Arkent, Aquasorb) | | 12% | | 8% | | 12% | | 8% |
| Mineral spirits | | | 10% | | | | | |
| Total | 100% | 100% | 100% | 100% | 100% | 100% | 100% | 100% |
| Stretch treatment | 50% TD | | ~20% MT | | 50% TD | | 100% TD | |
| Original Wt (ave.), g | 0.42 | | 0.51 | | 0.61 | | 0.61 | |
| Original thickness (ave.), μm | 550 | | 535 | | 878 | | 715 | |
| Average wt gain, 24 h RT, % | 47% | | 44% | | 43% | | 35% | |
| Average thickness gain, 24 h RT, % | 51% | | 2% | | 54% | | 13% | |
| Average wt gain after 70 c., % | 59% | | 8% | | 60% | | 9% | |
| Average thickness gain after 70 C., % | 35% | | 5% | | 39% | | 11% | |
| Time to wetout (IPA), s | >60 | | >60 | | >60 | | >60 | |
| Resistivity in 30% KOH: ρ, Ωcm | 56 | | 218 | | 16 | | 133 | |
| R in 30% KOH after 70 C., 1 h: ρ, Ωcm | 48 | | 232 | | 16 | | 172 | |

EXAMPLE 3

Referring to Table 3 below, there are shown, by composition and performance, a number of samples of single-layer membranes comprising polypropylene and polyisobutylene. Samples 3A and 3B in Table 3 refer to membranes that have not been stretched. The membrane of Sample 3A was then of the thermoplastic polymer and the non-cross-linked elastomer to form a monolithic structure. The micropores in the membrane represent the spaces that were previously occupied by the compatibilizing agent, which has since been removed, and that have been elongated by stretching.

TABLE 3

|  | Sample | | | |
| --- | --- | --- | --- | --- |
|  | 3A | 3A S | 3B | 3B S |
| Polyisobutylene | 40% | 40% | 49% | 49% |
| Polyethylene HDPE 2908 | 33% | 33% | 17% | 17% |
| Surfactant | 14% | 14% | 0% | 0% |
| Silica | 3% | 3% | 3% | 3% |
| Polyox | 10% | 10% | 16% | 16% |
| Mineral Spirits | 0% | 0% | 16% | 16% |
| Total | 100% | 100% | 100% | 100% |
| Stretch treatment, % | None | 150% TD | None | 200% TD |
| Initial weight (ave), g | 0.13 | 0.07 | 0.19 | 0.08 |
| Initial thickness (ave), µm | 164 | 140 | 283 | 230 |
| Average weight gain, 6 d RT, % | 20% | 65% | 53% | 107% |
| Average thickness gain, 6 d RT, % | 9% | 1% | 17% | −4% |
| Average weight gain after 70 C., % | 63% | 94% | 102% | 147% |
| Average thickness gain after 70 C., % | 34% | 5% | 30% | −22% |
| Time to wet-out (IPA), s | >60 | >60 | >60 | >60 |
| Resistivity in Li electrolyte RT, ρ, Ω-cm | 62458 | 11014 | 18668 | 515 |
| Resistivity in Li electrolyte after 70 C. soak, ρ, Ω-cm | 40701 | 2749 | 7150 | 321 |

EXAMPLE 4

Referring to Table 4 below, there are shown, by composition and performance, a number of samples of single-layer membranes comprising either a combination of polypropylene and polyisobutylene or a combination of cyclic olefin copolymer and polyisobutylene. More specifically, samples 4A and 4B included a combination of cyclic olefin copolymer and polyisobutylene and were prepared by dissolving the polyisobutylene and cyclic olefin copolymer in mineral spirits with mixing for 24 hours. Next, the mixture was cast into a film on a TEFLON polytetrafluoroethylene (PTFE) sheet support, the film and the PTFE sheet were then immersed in an acetone bath, coagulating the film structure, and the film was allowed to dry. Samples 4C, 4C S 1, and 4C S2, which included a combination of polypropylene and polyisobutylene, were prepared by extrusion. The polyisobutylene and polyolefin membranes were tested in a 30% KOH and lithium electrolyte, both in unstretched and stretched states. As can be seen, samples 4A and 4B achieved low resistivity by the high solvent casting method whereas an orientation stretch was needed to reduce the resistivity for the polypropylene and polyisobutylene membrane. Sample 4C showed significant resistivity reduction after TD stretch (Sample 4C S2).

TABLE 4

|  | Sample | | | | |
| --- | --- | --- | --- | --- | --- |
|  | 4A | 4B | 4C | 4C S1 | 4C S2 |
| Polyisobutylene | 5% | 4.5% | 12% | 12% | 12% |
| Polypropylene | 0% | 0% | 45% | 45% | 45% |
| Cyclic Olefin Copolymer 6017 | 5% | 4.5% | 0% | 0% | 0% |
| Silica | 0% | 1% | 0% | 0% | 0% |
| Mineral Spirits | 90% | 90% | 43% | 43% | 43% |
| Total | 100% | 100% | 100% | 100% | 100% |
| MD Stretch treatment | None | None | None | 140% | 230% |
| TD Stretch treatment | None | None | None | 140% | 230% |
| Resistivity in 30% KOH: ρ, Ω-cm | 42 | 88 | 23,275 | 591 | 221 |
| Resistivity in lithium electrolyte: ρ, Ω-cm | NA | NA | 435,000 | 19,310 | 6316 |
| Porosity % | 38% | 44% | 27% | 75% | 80% |

EXAMPLE 5

Referring to Table 5 below, there are shown, by composition and performance, a number of comparative samples that lack either a thermoplastic polymer (such as polypropylene) or a non-cross-linked elastomer (such as polyisobutylene). Samples 5A and 5B in Table 5 refer to separators that lack polypropylene, such samples not being self-supporting membranes and, instead, being self-sticks or membranes without physical integrity. Sample 5C refers to a separator lacking the non-cross-linked elastomer, such a sample having poor elasticity. In fact, said separator was unable to sustain a stretch beyond 100% without tearing.

TABLE 5

|  | Sample | | |
| --- | --- | --- | --- |
|  | Comp 5A | Comp 5B | Comp 5C |
| Polyisobutylene | 5% | 5% | 0% |
| Polypropylene | 0% | 0% | 59% |
| Mineral Spirits | 95% | 90% | 39% |
| Silica | 0% | 5% | 2% |
| Total | 100% | 100% | 100% |
| Process | The solution was cast onto a glass | The solution was cast onto a | Extrusion cast film, described by Example 1 |

TABLE 5-continued

|  | Sample | | |
| --- | --- | --- | --- |
|  | Comp 5A | Comp 5B | Comp 5C |
|  | plate and dried | glass plate and dried |  |
| Results | The film was stuck to the glass plate, unable to produce a contiguous film | The film was non-uniform, the dried layer was "chalky" and brittle, unable to produce a contiguous uniform film | Film was weak and unable to stretch beyond 100% in the TD direction, film torn on stretch |
| Resistivity in lithium electrolyte: $\rho$, $\Omega$-cm | Not tested | Not tested | 517 |

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A microporous sheet product made by a method comprising (a) melt-extruding an extrusion mixture through a die to form a sheet material, the extrusion mixture comprising (i) a thermoplastic polymer, wherein the thermoplastic polymer comprises at least one polyolefin, (ii) a non-cross-linked elastomer, the non-cross-linked elastomer having a molecular weight of at least 50,000 Da, wherein the non-cross-linked elastomer comprises one or more members selected from the group consisting of polyisobutylene, polyisoprene, thermoplastic elastomers of polyolefin, polyurethane, and polyester, and copolymers and terpolymers thereof, and (iii) a compatibilizing agent, the compatibilizing agent promoting mixing of the thermoplastic polymer and the non-cross-linked elastomer, wherein the compatibilizing agent comprises at least one member selected from the group consisting of mineral oil, a glycol, and a surfactant; (b) then, cooling the sheet material, wherein micropores are formed in the sheet material; and (c) then, stretching the cooled sheet material in exactly one direction, wherein the exactly one direction is one of a machine direction along which the sheet material exits the die and a transverse direction that is both perpendicular to the machine direction and within a plane defined by length and breadth dimensions of the sheet material, wherein a network of interconnected micropores results, with the non-cross-linked elastomer forming fibrils connecting thermoplastic dense regions; (d) wherein the microporous sheet product has micropores having an aspect ratio of at least 2:1 in the plane defined by the machine direction and the transverse direction.

2. The microporous sheet product as claimed in claim 1 wherein the thermoplastic polymer further comprises one or more thermoplastic polymers selected from the group consisting of polyamides, polyethylene terephthalate, polyacrylics, and polyvinyl acetate.

3. The microporous sheet product as claimed in claim 1 wherein the thermoplastic polymer further comprises one or more polyamides.

4. The microporous sheet product as claimed in claim 1 wherein the polyolefin comprises at least one member selected from the group consisting of a polyethylene and a polypropylene.

5. The microporous sheet product as claimed in claim 1 wherein the thermoplastic polymer constitutes about 15-90% by volume of the extrusion mixture.

6. The microporous sheet product as claimed in claim 1 wherein the non-cross-linked elastomer has a molecular weight of at least 100,000 Da.

7. The microporous sheet product as claimed in claim 6 wherein the non-cross-linked elastomer has a molecular weight of between 200,000 Da and 10,000,000 Da.

8. The microporous sheet product as claimed in claim 1 wherein the non-cross-linked elastomer comprises a polyisobutylene.

9. The microporous sheet product as claimed in claim 1 wherein the non-cross-linked elastomer constitutes about 1-50% by volume of the extrusion mixture.

10. The microporous sheet product as claimed in claim 1 wherein the compatibilizing agent constitutes about 1-80% by volume of the extrusion mixture.

11. The microporous sheet product as claimed in claim 10 wherein the compatibilizing agent constitutes about 5-70% by volume of the extrusion mixture.

12. The microporous sheet product as claimed in claim 11 wherein the compatibilizing agent constitutes about 10-60% by volume of the extrusion mixture.

13. The microporous sheet product as claimed in claim 1 wherein the thermoplastic polymer constitutes about 15-90% by volume of the extrusion mixture, wherein the non-cross-linked elastomer constitutes about 1-50% by volume of the extrusion mixture, and wherein the compatibilizing agent constitutes about 1-80% by volume of the extrusion mixture.

14. The microporous sheet product as claimed in claim 1 wherein the extrusion mixture further comprises a superabsorbent polymer.

15. The microporous sheet product as claimed in claim 14 wherein the superabsorbent polymer constitutes up to about 40% by volume of the extrusion mixture.

16. The microporous sheet product as claimed in claim 1 wherein the extrusion mixture further comprises an inorganic filler.

17. The microporous sheet product as claimed in claim 16 wherein the inorganic filler constitutes up to about 20% by volume of the extrusion mixture.

18. The microporous sheet product as claimed in claim 1 wherein the microporous sheet product has micropores with an average pore size below 5 microns.

19. A multilayer sheet product, the multilayer sheet product comprising a plurality of stacked layers, wherein at least one of the stacked layers is the microporous sheet product of claim 1.

20. A multilayer sheet product, the multilayer sheet product comprising a first layer and a second layer, the first layer and the second layer being in direct contact with one another, the first layer comprising the microporous sheet product of claim 1, the second layer being devoid of the non-cross-linked elastomer.

* * * * *